US012586120B2

(12) United States Patent
Lichtmess

(10) Patent No.: US 12,586,120 B2
(45) Date of Patent: Mar. 24, 2026

(54) LOCATION-BASED SYSTEM FOR CHARITABLE DONATION

(71) Applicant: ELP Global LLC, Wilmington, DE (US)

(72) Inventor: Eric Lichtmess, Santa Monica, CA (US)

(73) Assignee: ELP GLOBAL LLC, Wilmington, DE (US)

( * ) Notice: Subject to any disclaimer, the term of this patent is extended or adjusted under 35 U.S.C. 154(b) by 262 days.

(21) Appl. No.: 17/655,161

(22) Filed: Mar. 16, 2022

(65) Prior Publication Data

US 2022/0301039 A1      Sep. 22, 2022

Related U.S. Application Data

(60) Provisional application No. 63/161,504, filed on Mar. 16, 2021.

(51) Int. Cl.
*G06Q 30/00* (2023.01)
*G06Q 30/0601* (2023.01)

(52) U.S. Cl.
CPC .............................. *G06Q 30/0633* (2013.01)

(58) Field of Classification Search
CPC .............. G06Q 30/00; G06Q 30/0601; G06Q 30/0623; G06Q 30/0641
See application file for complete search history.

(56) References Cited

U.S. PATENT DOCUMENTS

| | | | | |
|---|---|---|---|---|
| 6,311,178 B1* | 10/2001 | Bi | ..................... | G06F 16/24578 707/948 |
| 8,407,110 B1* | 3/2013 | Joseph | ............... | G06Q 30/0633 705/26.81 |
| 8,498,974 B1* | 7/2013 | Kim | ..................... | G06F 16/245 707/706 |
| 2002/0082969 A1* | 6/2002 | O'Keeffe | ............... | G06Q 40/04 705/37 |
| 2003/0065805 A1* | 4/2003 | Barnes, Jr. | ......... | G06Q 30/0643 709/244 |

(Continued)

OTHER PUBLICATIONS

Krig, Billy. "Analysis and Optimization of the User Interface for an Effective Altruism Charity Application: Implementing gamification with the purpose to enhance user engagement and increase user retention." (2019). (Year: 2019).*

*Primary Examiner* — Christopher B Seibert
(74) *Attorney, Agent, or Firm* — Blank Rome LLP

(57) ABSTRACT

A location-based system that provides functionality for a donor to identify a person in need of essential items in their community and purchase and donate the exact essential items requested by the person in need while the donor is shopping at a retailer that sells those exact essential items. In some embodiments, the system identifies that the donor is shopping at a retailer based on the location of a donor computing device (e.g., a smartphone). In other embodiments, the system and an e-commerce retailer generate a hybrid webpage that includes both online shopping functionality and products requested by a person in need in the donor's community that can be added to the donor's online shopping cart and sent to the person in need. In other embodiments, the system uses a network-connected locker system to enable donors to donate used goods (e.g., clothing) specifically requested by a person in need.

7 Claims, 7 Drawing Sheets

(56)                    References Cited

U.S. PATENT DOCUMENTS

| | | | | |
|---|---|---|---|---|
| 2004/0006497 | A1* | 1/2004 | Nestor | G06Q 10/02 |
| | | | | 705/5 |
| 2007/0112730 | A1* | 5/2007 | Gulli | G06F 16/951 |
| 2007/0174144 | A1* | 7/2007 | Borders | G06Q 10/0837 |
| | | | | 705/26.81 |
| 2007/0208598 | A1* | 9/2007 | McGrady | G16H 15/00 |
| | | | | 705/3 |
| 2007/0211651 | A1* | 9/2007 | Ahmed | H04L 67/104 |
| | | | | 370/256 |
| 2008/0078828 | A1* | 4/2008 | Helmin | G06Q 30/06 |
| | | | | 235/375 |
| 2009/0234848 | A1* | 9/2009 | Leff | G06F 16/951 |
| | | | | 707/999.005 |
| 2010/0138281 | A1* | 6/2010 | Zhang | G06Q 10/087 |
| | | | | 705/28 |
| 2010/0169361 | A1* | 7/2010 | Chen | G06F 16/285 |
| | | | | 707/769 |
| 2013/0073387 | A1* | 3/2013 | Heath | G06Q 30/02 |
| | | | | 705/14.53 |
| 2015/0180971 | A1* | 6/2015 | Varney | G06F 15/177 |
| | | | | 709/204 |
| 2015/0317668 | A1* | 11/2015 | Tietzen | G06Q 20/20 |
| | | | | 705/14.55 |
| 2016/0055430 | A1* | 2/2016 | Naji | G06Q 50/01 |
| | | | | 705/5 |
| 2016/0080390 | A1* | 3/2016 | Kalb | G06Q 50/01 |
| | | | | 726/4 |
| 2016/0125482 | A1* | 5/2016 | d'Alancon | G06Q 20/22 |
| | | | | 705/329 |
| 2016/0292737 | A1* | 10/2016 | Barnes, Jr. | G06Q 20/322 |
| 2018/0025402 | A1* | 1/2018 | Morris | G06Q 30/0611 |
| | | | | 705/80 |

* cited by examiner

400

180

160

PROVIDE E-COMMERCE FUNCTIONALITY 402

PROVIDE LINK TO BECOME DONOR 404

RECEIVE DONOR DATA 422

IDENTIFY DONOR RESIDENCE 424

MATCH DONOR RESIDENCE WITH REQUESTOR RESIDENCE 426

IDENTIFY REQUESTOR 428

IDENTIFY REQUESTED PRODUCTS 430

PROVIDE FUNCTIONALITY TO PURCHASE AND DONATE REQUESTED PRODUCTS 350

600

180

160

402 — PROVIDE E-COMMERCE FUNCTIONALITY

604 — RECEIVE UNIQUE IDENTIFIER

622 — IDENTIFY DONOR DATA

424 — IDENTIFY DONOR RESIDENCE

426 — MATCH DONOR RESIDENCE WITH REQUESTOR RESIDENCE

428 — IDENTIFY REQUESTOR

430 — IDENTIFY REQUESTED PRODUCTS

350 — PROVIDE FUNCTIONALITY TO PURCHASE AND DONATE REQUESTED PRODUCTS

LOCATION-BASED SYSTEM FOR CHARITABLE DONATION

CROSS-REFERENCE TO RELATED APPLICATIONS

This application claims priority to U.S. Prov. Pat. Appl. No. 63/161,504, filed Mar. 16, 2021, which is hereby incorporated by reference in its entirety.

BACKGROUND

Many people are happy to help those in need, particularly residents of their community. However, an enormous percentage of charitable donations are eaten up by the administrative costs to administer inefficient and ineffective programs. Clothing is donated that may not fit anyone in need. Those clothes and household items donated to charitable organizations are sold rather than given to those in need of them. Food pantries receive donated food that may not meet the dietary needs of those they are trying to help. And all of those items require time and effort to sort and are stored in facilities that require rent or mortgage payments as well as maintenance and utility costs.

Hygiene Poverty is a severe struggle for millions, not being able to afford and get targeted support with essential household items like shampoo, toothpaste, toilet paper etc. The most effective way to help those in need is to give items that are essential to sustain life and health directly to those who cannot afford to purchase them on their own. Many people are happy to donate their used possessions like clothing. However, for that donation to efficiently and effectively help someone, donated items need to go to those who want and need the items being donated. Donors can list their items online, but donors are often uncomfortable with people picking up items from their home. Individuals and organizations can make wish lists of items they want from Amazon and other online retailers. However, donors have no way to gauge whether they are donating to the individual or organization that is most in need of those times. Instead, online donations usually flow to those who can best promote those efforts (e.g., on social media). Donors have no idea who actually receives an item, by when and how much of the donation value is reaching a person, as well as do the right items reach the right person in need, at the right time.

Each time someone walks through the aisles of a retail store is an opportunity to help someone sustain their life and their health and make a person feel good about their decision to help others. Many people would gladly purchase a box of diapers or feminine hygiene products for someone who needs them, but only if they knew the exact product needed (including the type and the size), they had an easy way to see that those items are delivered instantly to the person in need, and they could be assured that the person requesting them truly couldn't afford them.

Accordingly, there is a need for a system that allows a donor to identify a person in need in their community and allows them to purchase and donate the exact essential items requested by that person while the donor is shopping at a retailer that sells those exact essential items. Additionally, there is a need for a system ensures that items donated by a donor—either by purchasing them from a retailer or donating them from their personal possessions—are safely and easily sent to the person in need.

SUMMARY

In order to overcome those and other drawbacks, disclosed is a location-based system that provides functionality for a donor to identify a person in need of essential items in their community and purchase and donate the exact essential items requested by the person in need while the donor is shopping at a retailer that sells those exact essential items and can ship those items directly to the people in need of those items.

In some embodiments, the system identifies that the donor is shopping at a retailer based on the location of a donor computing device (e.g., a smartphone). In other embodiments, the system and an e-commerce retailer generate a hybrid webpage that includes both online shopping functionality and products requested by a person in need in the donor's community that can be added to the donor's online shopping cart and sent to the person in need.

In other embodiments, the system enables donors to donate their used possessions (e.g., clothing) directly to members of their community in need. In those embodiments, the system provides those in need with an online shopping experience to identify goods that they truly want and need. In some of those embodiments, the system uses a network-connected locker system to enable donors to safely, securely, and conveniently donate used goods (e.g., clothing) specifically requested by a person in need. Accordingly, the system enables those in need to request items without the awkwardness of having to make the exchange in person and enables the donor to donate an item without the need to give out their home address.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments.

DETAILED DESCRIPTION

Figure 1:
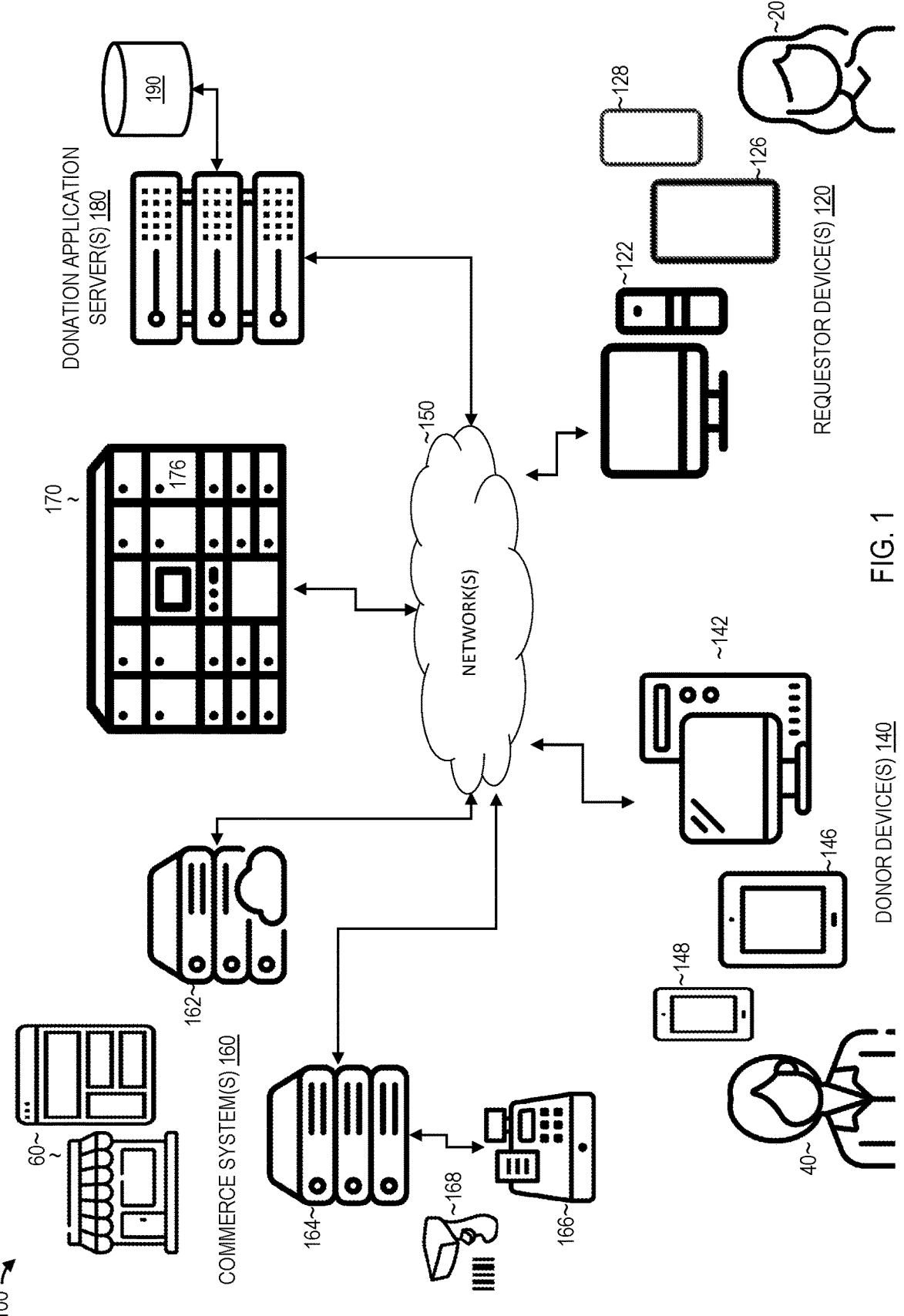
FIG. 1 is a diagram of an architecture of the disclosed system according to various exemplary embodiments.

Reference to the drawings illustrating various views of exemplary embodiments is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1 is a diagram of an architecture 100 of a location-based system 200 for charitable giving according to various exemplary embodiments.

As shown in FIG. 1, the architecture 100 includes one or more donation application servers 180 in communication with one or more requestor computing devices 120, one or more donor computing devices 140, and one or more commerce systems 160 via one or more networks 150. The donation application server(s) 180 include one or more hardware processing devices and non-transitory computer readable storage media 130. In some of the embodiments described below, the donation application server(s) 180 also communicate via the network(s) 150 with one or more network-connected locker system(s) 170.

The requestor computing devices 120 may include any suitable computing device that executes instructions to send and receive data to/from the donation application servers 180 and provides a graphical user interface to receive instructions from a requestor 20 and display information to that requestor 20. Similarly, the donor computing devices 140 may include any suitable computing device that executes instructions to send and receive data to/from the donation application servers 180 and provides a graphical user interface to receive instructions from a donor 40 and display information to that donor 40. The requestor computing devices 120 may include, for example, (desktop or notebook) personal computers 122, tablet computers 126, smartphones 128, etc. The donor computing devices 140 may include, for example, (desktop or notebook) personal computers 142, tablet computers 146, smartphones 148, etc.

In some of the embodiments described below, the donor computing devices 140 may be a portable device (e.g., a smartphone 148) that outputs information indicative of the location of the donor computing devices 140. In those embodiments, the location of the donor computing device 140 may be determined, for example, using the global position system (GPS), network identification, cell tower identification, cell tower triangulation, etc.

The network(s) 150 may include any combination of wireless and/or wired networks. The network(s) 150 may include, for example, a wide area network (e.g., the Internet), a cellular network, a local area network, etc.

The commerce system(s) 160 may include the electronic commerce server(s) 162 of one or more retailers 60 that provide products for purchase via the internet (e.g., by a donor 40 using a web browser of a donor computing device 140). In some embodiments, the commerce system(s) 160 may include the point-of-sale terminal(s) 166 of one or more retailers 60 that include a physical retail store. The point-of-sale terminal(s) 166 may include, for example, a barcode or QR code scanner 168 for identifying products for purchase, a retail computing system 164 for processing transactions, etc. Because some retailers 60 provide both retail locations and online orders, some commerce systems 160 may include both a retail computing system 164 and an electronic commerce server 162 in communication via the one or more networks 150.

The donation application server(s) 180 may include any suitable computing device that executes instructions to perform the functions described herein. The donation application server(s) 180 may include, for example, a web server that provides a user interface that is accessible by requestor computing devices 120 and/or donor computing devices 140 using a web browser. Additionally or alternatively, the donation application server(s) 180 may include an application server that makes software executed by the donation application server(s) 180 accessible to a software program executed by requestor computing devices 120 and/or donor computing devices 140. The application server may be a mobile application server that makes software executed by the donation application server(s) 180 accessible to a mobile application running on requestor computing devices 120 and/or donor computing devices 140.

The computer readable storage media 190 may include any hardware storage medium, such as a hard disk, solid-state memory, etc. The computer readable storage media 190 may be internal to the donation application server(s) 180. Alternatively, the donation application server(s) 180 may communicate with the computer readable storage media 190 via a wired connection, a wireless connection, a local area network, etc.

The network-connected locker system(s) 170 may be any device that stores items for pickup and outputs information to the donation application server(s) 180 via the one or more networks 150. The network-connected locker system(s) 170 may be, for example, an automated device with a number of lockers 176 that are each configured to receive and securely store items (e.g., from donors 40) and provide access to those items to individuals (e.g., requestors 20) granted access to those items by the system 200. In some instances, the network-connected locker system(s) 170 may be located in a retail store of one of the retailers 60.

In some embodiments, each time items are stored in one of the lockers 176, a personal identification number (PIN) is generated (e.g., by the network-connected locker system 170 or the donation application server 180) or specified by a user (e.g., the donor 40 placing items in the lockers 176) for providing access to the contents of the locker 176. In those embodiments, each locker 176 may include an input device (e.g., a keypad) for providing a PIN to gain access to that locker 176 or the network-connected locker system(s) 170 may include an input device (e.g., a touch-screen display) for providing a PIN to gain access to any locker 176 specified by the user. Additionally or alternatively, the network-connected locker system(s) 170 may provide access to a locker 176 in response to an instruction from the donation application server 180, received via the network(s) 150, to grant access to a user (e.g., a requestor 20 using a requestor device 120 to request access to a locker 176).

As described in detail below, the disclosed is a location-based system that provides functionality for a donor to identify a person in need of essential items in their community and purchase and donate the exact essential items requested by the person in need while the donor is shopping at a retailer that sells those exact essential items and can ship those items directly to the people in need of those items. In some embodiments, the system identifies that the donor is shopping at a retailer based on the location of a donor computing device (e.g., a smartphone). In other embodiments, the system and an e-commerce retailer generate a hybrid webpage that includes both online shopping functionality and products requested by a person in need in the donor's community that can be added to the donor's online shopping cart and sent to the person in need.

In other embodiments, the system enables donors to donate their used possessions (e.g., clothing) directly to members of their community in need. In those embodiments, the system provides those in need with an online shopping experience to identify goods that they truly want and need. In some of those embodiments, the system uses a network-connected locker system to enable donors to safely, securely, and conveniently donate used goods (e.g., clothing) specifically requested by a person in need. Accordingly, the system enables those in need to request items without the awkwardness of having to make the exchange in person and enables the donor to donate an item without giving out their home address.

Figure 2:
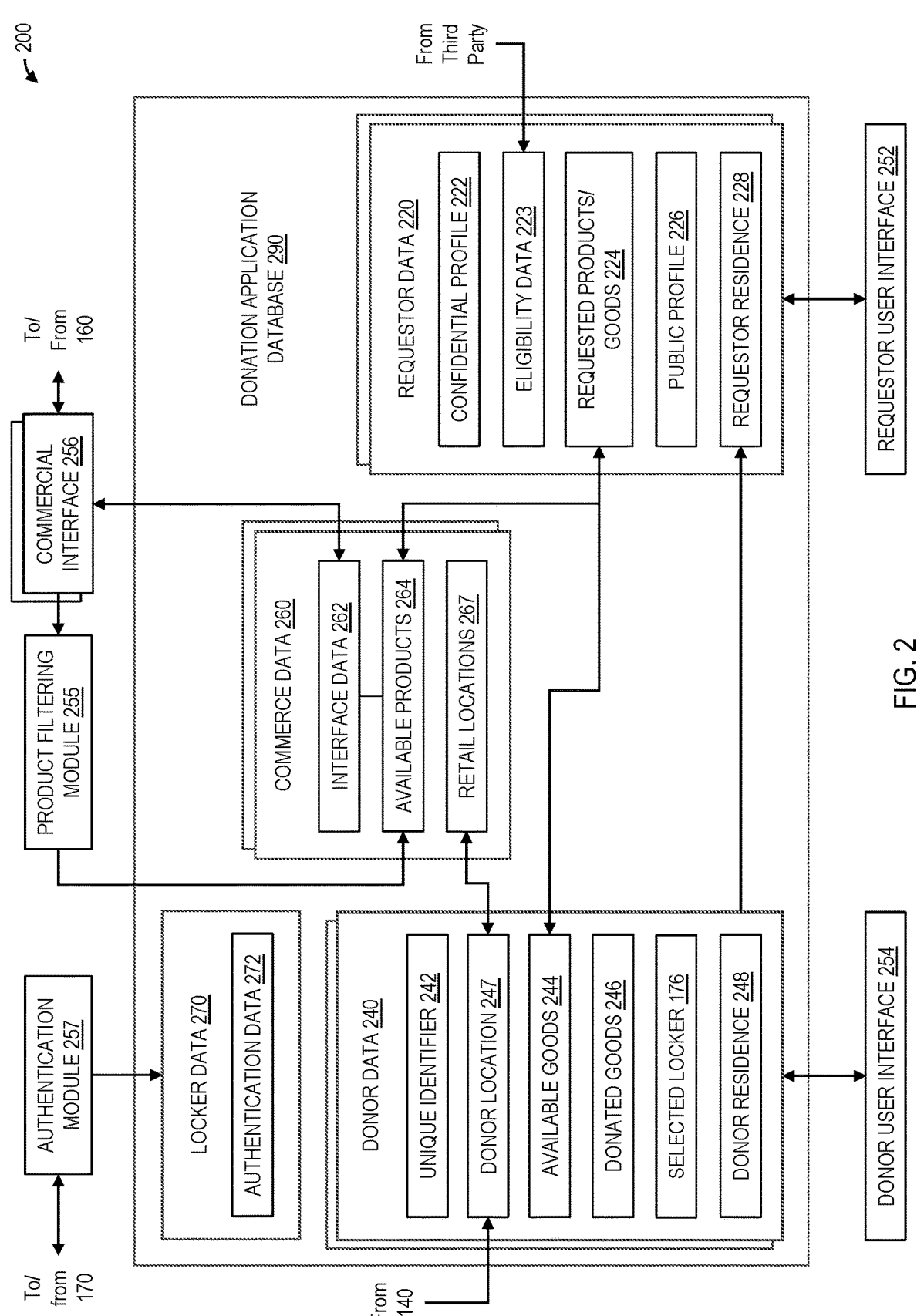
FIG. 2 is a block diagram of a location-based system for charitable giving according to various exemplary embodiments.

FIG. 2 is a block diagram of the location-based system 200 for charitable giving according to various exemplary embodiments.

As shown in FIG. 2, the system 200 includes a donation application database 290, a requestor user interface 252, a donor user interface 254, and a commercial interface 256. In some embodiments, the system 200 includes a product filtering module 255 and/or an authentication module 257.

The donation application database 290 may be any collection of information that enabling the system 200 to provide the functions described herein. The donation application database 290 may be stored, for example, in the computer readable storage media 190. The donation application database 290 includes requestor data 220, donor data 240, and commerce data 260. In some embodiments, the donation application database 290 includes locker data 270.

The requestor user interface 252 may be any interface that receives instructions from requestors 20 via a requestor computing device 120 and displays information to requestors via the requestor computing device 120. Similarly, the donor requestor user interface 254 may be any interface that receives instructions from donors 40 via a donor computing device 140 and displays information to requestors via the donor computing device 140. In some embodiments, the requestor user interface 252 and the donor user interface 254 may be realized by software instructions stored and executed by the donation application server(s) 180. In those embodiments, the requestor user interface 252 and the donor user interface 254 may be, for example, a web application accessible via a web browser. In other embodiments, the requestor user interface 252 and/or the donor user interface 254 may be realized by a software application (e.g., a smartphone application, a desktop software application, etc.) downloaded, stored, and executed by the requestor computing device 120 and/or the donor computing device 140. The requestor data 220 includes information associated with each of the requestors 20. The requestor data 220 for each requestor 20 may include a confidential profile 222, eligibility data 223, products or goods requested by requestor 20 (requested products/goods 224), a public profile 226, and the residential location (e.g., zip code, municipality, etc.) of the requestor 20 (requestor residence 228). The confidential profile 222 includes information regarding the requestor 20 (e.g., street address) used by the system 200 that is not provided to donors 40. The eligibility data 223 includes information indicating that the requestor 20 is eligible for assistance. For example, the eligibility data 223 may be information confirming that the requestor is eligible for public assistance from the government. With the exception of the eligibility data 223, which may be received from a third party (e.g., a government agency or a third party that assists individuals to receive government assistance), the requestor data 220 may be received from requestor computing devices 120 via the requestor user interface 252.

The donor data 240 includes information associated with each of the donors 40. The donor data 240 for each donor 40 may include a unique identifier 242 (e.g., email address or telephone number) and the residential location (e.g., zip code, municipality, etc.) of the donor 40 (donor residence 248). The donor data 240 may be received, for example, via the donor user interface 254.

The donation application server 180 identifies a requestor 20 in the donor's community by comparing the donor residence 248 and the requestor residences 228 of each of the requestors 228. In some instances, the donation application server 180 may identify a requestor 20 having a requestor residence 228 that is the same as or within a predetermined distance of a donor residence 248 of a donor 40. In other instances, the donation application server 180 may identify the requestor 20 having a requestor residence 228 that is closest to the donor residence 248 of a donor 40. Accordingly, the donation application server 180 is able to identify a person in need in the donor's community and enable that donor 40 to provide direct assistance to that person in need by purchasing requested products 224 for that requestor and, in some embodiments, donating requested goods 224 to that requestor 20.

The commercial interface 256 may be any interface that parses information (e.g., commerce data 260) received from the commerce system(s) 160 and outputs information to the commerce system(s) 160 using the format(s) and protocol(s) specified by the commerce system(s) 160. For example, the commercial interface 256 may request information from an application programming interface (API) endpoint provided by the commerce system(s) 160 using an API protocol specified by the commerce system(s) 160 and then parse information received from that API endpoint.

The commerce data 260 includes information regarding each retailer 60 and the available products 264 from each retailer 60. In some embodiments, the system 200 includes a product filtering module 255 that filters the products available from each retailer 60 to include only those products or services made available for purchase and donation by the system 200 (e.g., essential items such as supplies for children and babies, home or educational supplies, clothing, health items or supplements, hygiene items, food, telephone service, internet service, transportation, etc.) to be shipped by the retailer to the requestor.

The commerce data 260 may also include interface data 262 (e.g., associated with each of the available products 264) used by the system 200 to enable donors 40 to purchase the available products 264 and donate those available products to requestors 20. In embodiments where available products 264 are offered for purchase by donors 40 online, for instance, the interface data 262 may include information necessary for the electronic commerce server 162 of the retailer 60 to identify requested products 264 requested by a requestor 20 in a donor's community. The interface data 262 may be formatted using a format specified by the commerce system 160 of the retailer 60 and output by the commercial interface 256 using a protocol specified by the commerce system 160 of the retailer 60 (e.g., using the API endpoint).

In those embodiments, the electronic commerce server 162 may generate a hybrid webpage for display via the donor device 120 that includes, for example, the webpage used by the donor 40 to shop online via the electronic commerce server 162 and the requested products 224 requested by a requestor 20 from the donor's community. The hybrid webpage may include, for example, the shopping cart of the donor 40 with products being purchased by the donor 40 and a window or a widget that includes a request for the donor 40 to add requested products 224 to that shopping cart so that those requested products 224 may be shipped to the requestor 20. The window or widget may include information regarding the requestor 20 (e.g., the public profile 226, requestor residence 228, etc.). Accordingly, the system 200 enables the requestor 20 to personalize the request and informs the potential donor that the request is from a person in need from the potential donor's community.

In some embodiments, the portion of the hybrid webpage inside the window or widget may be generated by the donation application server 180. In those instances, the electronic commerce server 162 may generate the hybrid webpage to include a frame and output an instruction to the donation application server 180 to output web content in that frame. In those instances, if the donor 40 outputs an instruction (to the donation application server 180 via the donor device 120) to add the requested products 224 to the shopping cart of the electronic commerce server 162, the donation application server 180 may forward that instruction to the electronic commerce server 162 along with any interface data 262 required by the commerce system 160 to identify those requested products 224 from among the available products 264 of the retailer 60 and the information necessary to ship the requested products 224 to the requestor 20 (e.g., the name and shipping address of the requestor 20).

In some embodiments, the portion of the hybrid webpage inside the window or widget may be generated by the electronic commerce server 162. In those instances, the donation application server 180 may output information to the electronic commerce server 162 for generating the web content in the window or widget. The donation application server 180 may output, for example, the requested products 224, the interface data 262 required by the commerce system 160 to identify those requested products 224 from among the available products 264 of the retailer 60, the public profile 226 and/or requestor residence 228 of the requestor 20, etc.

In some embodiments, the system 200 enables donors 40 to purchase products while shopping in a retail store of a retailer 60. In those embodiments, the donation application server 180 provides functionality, using the donor user interface 254 output by the donor computing device 140, to view the public profile 226 of a requestor from the donor's community and identify the requested products 224 requested by that requestor 20. In those embodiments, the system 200 enables the donor 40 to purchase requested products 224 from the retailer 60 while in the store. For instance, the donor application server 180 may provide functionality for the donor 40 to select requested products 224 for a requestor 20 (e.g., via the donor computing device 140 via the donor user interface 254) and output an instruction to the retail computing system 164 of the retailer 60 that the donor 40 would like to purchase the requested products 224 for delivery to the requestor 20. In some embodiments, the donation application server 180 may transmit the information necessary for the donor 40 to purchase the requested products 224 for delivery to the requestor 20 via the network(s) 150. In those embodiments, the donation application server 180 may transmit any interface data 262 required by the commerce system 160 to identify those requested products 224 from among the available products 264 of the retailer 60 and the information necessary to ship the requested products 224 to the requestor 20 (e.g., the name and shipping address of the requestor 20).

In other embodiments, the donor computing device 140 may output information to the point-of-sale terminal(s) 166 of the retailer 60 for the retail computing system 164 to add the requested products 224 to the items being purchased by the donor 40. The donor computing device 140 may output that information to the point-of-sale terminal(s) 166 wirelessly (e.g., using near field communication), by displaying a barcode or QR code via the donor user interface 254 embedded with that information to be scanned by a barcode or QR code scanner 168 of the point-of-sale terminal(s) 166, etc. The information for the of the retailer 60 to add the requested products 224 to the items being purchased by the donor 40 may include the interface data 262 required by the retailer 60 to identify the requested products 224 from among the available products 264 of the retailer 60. The information transmitted to the retail computing system 164 may include the information necessary to ship the requested products 224 to the requestor 20 (e.g., the name and shipping address of the requestor 20). Alternatively, the information transmitted to the retail computing system 164 may include a transaction identifier, stored by the donation application server 180 to identify the purchase of the requested products 224 for the requestor 20. In those instances, the retail computing system 164 of the retailer 60 may output a request to the donation application server 180 via the network(s) 150 that identifies the purchase of the requested products 224 for the requestor 20 and requests that the donation application server 180 transmit the information, to the retail computing system 164 via the network(s) 150, necessary to ship the requested products 224 to the requestor 20.

In some embodiments, as donors 40 are shopping in a participating retail store 60, the system 200 may output notifications to those donors 40 that available products 264 at the retail store 60 have been requested by a person in need in their community. In those embodiments, the donation application server 180 may store the retail locations 267 of those retail stores 60 and receive data indicative of the real-time locations of the donor 40 (donor location 247) from the donor computing device 140. The donor location 247 may be determined, for example, using GPS, network identification, cell tower identification, cell tower triangulation, etc. Accordingly, in those embodiments, the donation application server 180 may compare donor locations 247 to the retail locations 267 and, in response to a determination that a donor location 247 of a donor 40 is within a predetermined distance of a retail location 267, may output a notification to the donor device 140 of that donor 40 that available products 264 from that retailer 60 have been requested by the person in need in the donor's community.

In some embodiments, the system 200 enables donors 40 to donate goods (e.g., clothing) directly to requestors 20. In those embodiments, the donor data 240 includes goods offered by the donor 40 (available goods 244), including size information, photographs (taken using the donor computing device 140 and/or uploaded via the donor user interface 254, etc. Eligible requestors 20 can the view the available goods 244 offered by donors 40 in their community via the requestor user interface 252.

In some embodiments, the system 200 enables donors 40 to transfer donated goods 246 to requestors 20 using the network-connected locker system(s) 170. In those embodiments, the donor data 240 includes the goods donated by the donor 40 (donated goods 246) and the selected locker 176 used to store and transfer the donated goods 246. In those embodiments, the system 200 may store locker data 270 used by the system 200 to enable donors 40 to safely and securely transfer donated products 246 donated by a donor 40 and selected by a requestor 20 using the network-connected locker system 170. In those embodiments, the system 200 may include an authentication module 257 that receives information (from the network-connected locker system 170 or the donor computing device 140) identifying the locker 176 (selected, for example, by the donor 40 or the network-connected locker system 170) used to store the donated products 246 for pickup by the requestor 20.

The network-connected locker system(s) 170 enable requesters 20 to request items without the awkwardness of having to make the exchange in person and allows donors 40 to donate items without the need to give out their home address.

The locker data 270 includes authentication data 272 used by the system 200 to enable requestors 20 to access the locker 176 used to store donated products 246 that have been donated by the donor 40 and selected by requestor 20. In some embodiments, the authentication data 272 identifies the requestor 20 that has been granted access to the locker 176 by the system 200 and, in response to a request sent by that requestor 20 using a requestor computing device 120, the donation application server 180 outputs an instruction to the network-connected locker system 170 to open the selected locker 176. In other embodiments, the authentication data 272 includes a PIN for providing access to the contents of the selected locker 176. In some instances, the PIN may be generated by the network-connected locker system 170 or the donation application server 180. In other instances, the PIN may be selected by the donor 40 and provided via the network-connected locker system 170 or the donor computing device 140. In those instances, the donation application server 180 outputs the PIN to the donor computing device 140 for use by the donor 40 to access the selected locker 176. In other instances, the PIN may be specified by the requestor 20 using the requestor computing device 120. In those instances, the donation application server 180 transmits the PIN to the network-connected locker system 170 for storage by the network-connected locker system 170 so that the network-connected locker system 170 can provide access to the selected locker 176 when the PIN is input by the requestor 20.

In any of the embodiments described above, the system 200 may provide functionality for the requestor 20 to send a message to the donor 40. Accordingly, requestors 20 can express their gratitude and donors 40 can be assured that their entire donation, without any of the waste and overhead of conventional charitable donation programs, went directly to a person who needed that product, wanted that specific product, and appreciated the donation.

Figure 3:
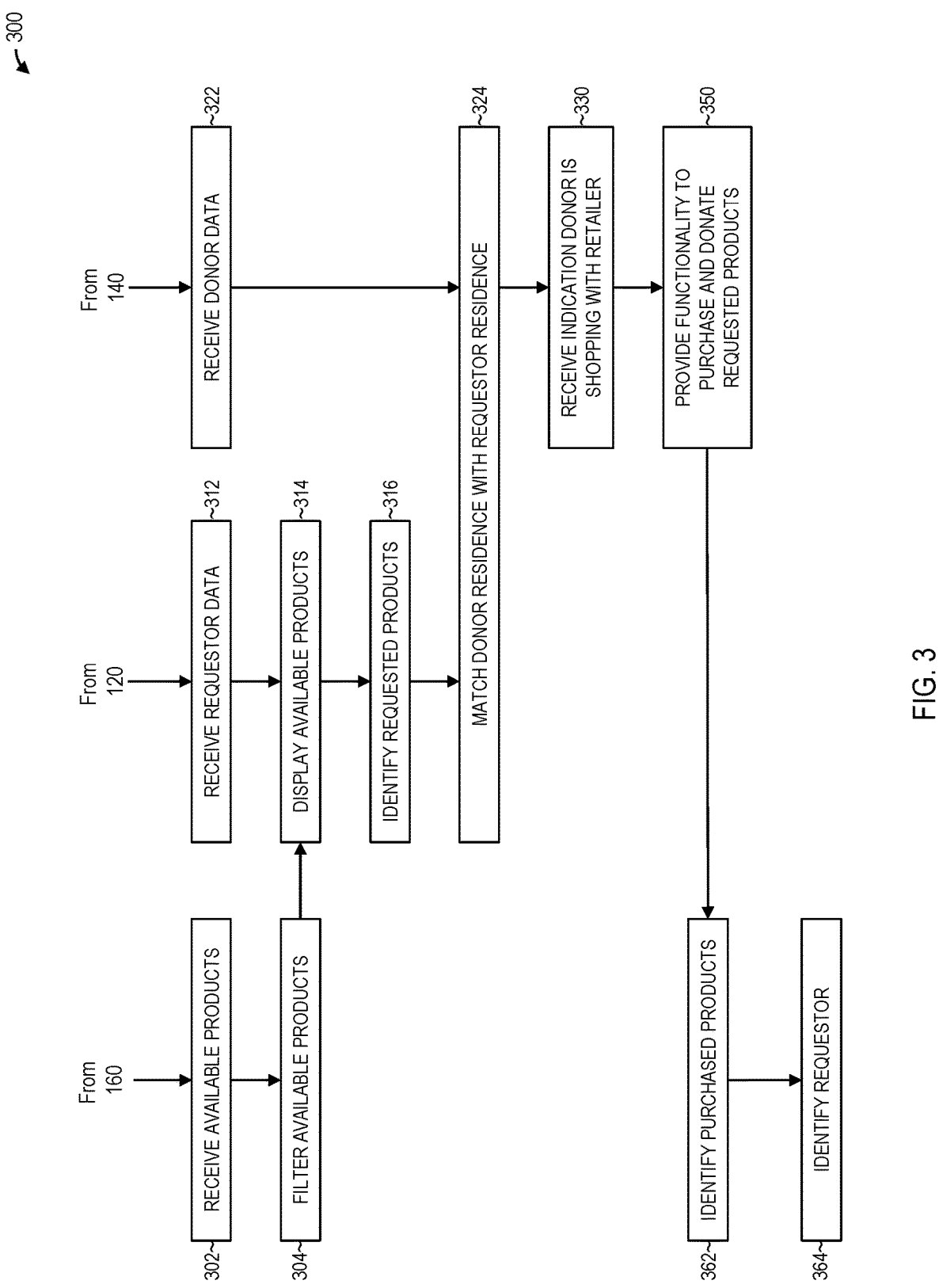
FIG. 3 is a flowchart illustrating a process for providing a donor with functionality for purchasing and donating requested products according to an exemplary embodiment.

FIG. 3 is a flowchart illustrating a process 300 for providing a donor 40 with functionality for purchasing and donating requested products 224 according to an exemplary embodiment.

As shown in FIG. 3, the donor application server 180 receives information identifying the products available from the retailer 60 (the available products 264) in step 302. In some embodiments, the available products 264 are filtered to include only essential products or services in step 304.

The donor application server 180 receives requestor data 220 from a requestor computing device 120 in step 312 and displays the available products 264 (received in step 302 and, in some embodiments, filtered in step 304) to the requestor 20 in step 314. In step 316, the donor application server 180 provides functionality for the requestor 20 to select and request available products 264 displayed in step 314.

The donor application server 180 receives donor data 240 from a donor computing device 140 in step 322. The donation application server 180 compares the donor residence 248 of the donor 40 with the requestor residences 228 of the requestors 20 in step 426 and identifies a requestor residence 228 of a requestor that is the same as the donor residence 248 of the donor 40, within a predetermined distance of the donor residence 248 of the donor 40, or closest to the donor residence 248 of the donor 40 in step 428. The donation application server 180 identifies a requestor 20 having a requestor residence 228 that is the same as or within a predetermined distance of the donor residence 248 in step 428. In step 430, the donation application server 180 identifies the products requested by the requester 20 identified in step 428 (identified products 224) from among the available products 264 offered by the commerce system 160 that referred the donor 40 in step 404.

The donor application server 180 receives an indication that the donor 40 is shopping at a retailer 60 in step 330. In some embodiments, for example, the donation application server 180 may store the retail locations 267 of retail stores 60, receive data indicative of the real-time locations of the donor 40 (donor location 247) from the donor computing device 140, and determine that a donor location 247 of a donor 40 is within a predetermined distance of a retail location 267. In other embodiments, the donor application server 180 may receive an indication from the commerce system 160 that a donor is shopping online via an electronic commerce server(s) 162 of an online retailer 60.

The commerce system 160 and the donation application server 180 provide functionality for the donor 40 to browse, purchase, and donate the requested products 224 in step 350. In the embodiments where the donor 40 is shopping online described above, the commerce system 160 may generate a hybrid webpage that includes the webpage used by the donor 40 to shop online via the commerce system 160 and the requested products 224 requested by the requestor 20 (and, for instance, the public profile 226 and/or requestor residence 228 of the requestor 20). In the embodiments where the donor 40 is shopping in a retail store described above, the donation application server 180 may provide functionality for the donor 40 to view, select, and purchase requested products 224 via the donor computing device 140.

The products purchased by the donor 40 are provided to the commerce system 160 in step 362. And the identity of the requestor 20 and the information necessary to ship the requested products 224 to the requestor 20 (e.g., the shipping address of the requestor 20) are provided to the commerce system 160 in step 364.

As described below, with reference to FIGS. 4 and 5, users can be referred to the system 200 by commerce systems 160 in a number of ways.

Figure 4:
FIG. 4 is a flowchart illustrating a process for identifying a person in need in a donor's community according to a first embodiment.

FIG. 4 is a flowchart illustrating a process 400 for identifying a requestor 20 located in or near the community of a donor 40 according to a first embodiment.

As shown in FIG. 4, the commerce system 160 provides electronic commerce functionality to a user (who may become a donor 40 using the process 400) in step 402. The commerce system 160 outputs a link inviting the user to become a donor 40 (for example, with an explanation of the process and a description of the organization providing the system 200) in step 404. By clicking the link provided in step 404, the user is directed (via the user interface of the donor device 140) to the donation application server 180, which provides functionality for the user to sign up to become a donor 40 and provide donor data 240 in step 422. The donation application server 180 identifies the donor residence 248 specified by the donor 40 in step 424.

The donation application server 180 compares the donor residence 248 of the donor 40 with the requestor residences 228 of the requestors 20 in step 426 and identifies a requestor residence 228 of a requestor that is the same as the donor residence 248 of the donor 40, within a predetermined distance of the donor residence 248 of the donor 40, or closest to the donor residence 248 of the donor 40 in step 428. In step 430, the donation application server 180 identifies the products requested by the requester 20 identified in step 428 (identified products 224) from among the available products 264 offered by the commerce system 160 that referred the donor 40 in step 404.

The commerce system 160 and the donation application server 180 provide functionality for the donor 40 to browse, purchase, and donate the requested products 224 in step 350.

Figure 5:
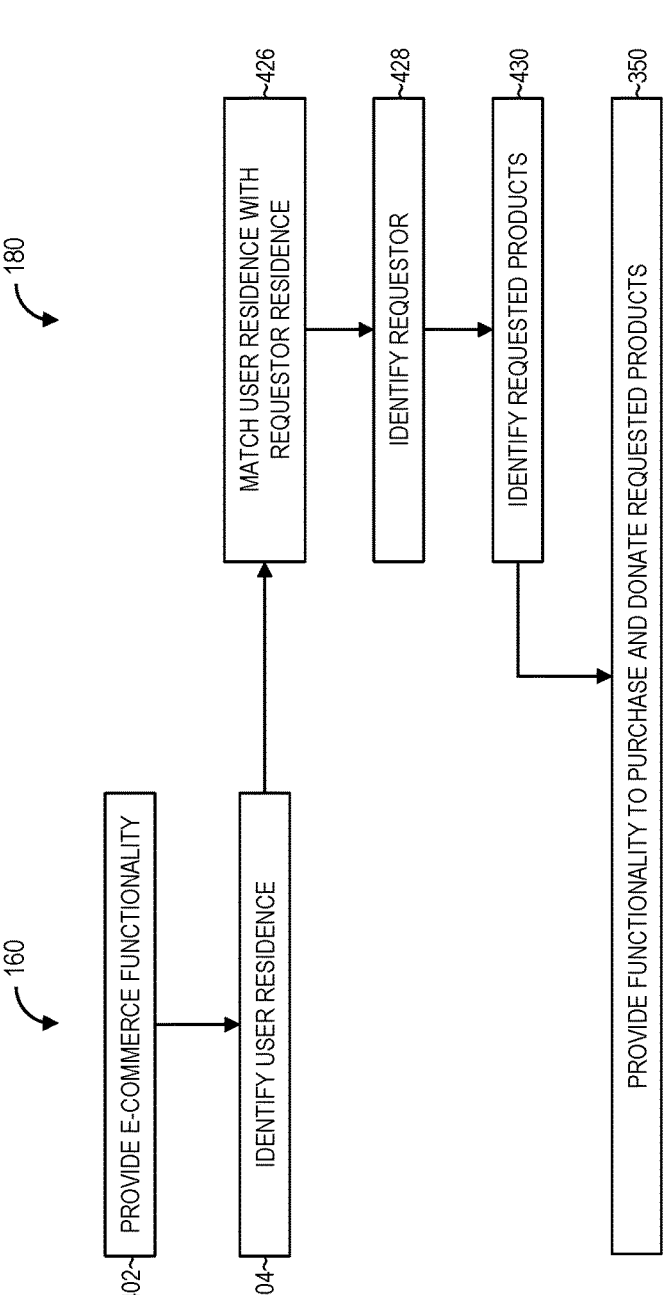
FIG. 5 is a flowchart illustrating a process for identifying a person in need in a donor's community according to an exemplary embodiment.

FIG. 5 is a flowchart illustrating a process 500 for identifying a person in need in a donor's community according to an exemplary embodiment.

As shown in FIG. 5, the commerce system 160 provides electronic commerce functionality to a user (who may become a donor 40 using the process 400) in step 402. Rather than outputting a link for the user to sign up with the service for purchasing and donating products, the commerce system 160 in the process 500 identifies the residential location (e.g., zip code, municipality, etc.) of the user (e.g., by generalizing, for example the billing or shipping address of the user) and outputs that residential location to the donation application server 180. Accordingly, the donation application server 180 can identify a requestor 20 in the user's community and appeal to the user to sign up for the service by making a more personalize appeal to assist the requestor 20.

For instance, the donation application server 180 may compare the residential location of the user with the requestor residences 228 of the requestors 20 in step 426 and identify a requestor residence 228 that is the same as the residential location of the user, within a predetermined distance of the residential location of the user, or closest to the residential location of the user in step 428. The donation application server 180 may identify the products requested by that requester 20 in step 430.

The commerce system 160 and the donation application server 180 may then provide functionality for the donor 40 to browse the requested products 224 (and review, for example, the public profile 226 of the requestor 20 as described above), and purchase, and donate the requested products 224 in step 350.

The system 200 also enables donors 40 to purchase and donate products from multiple retailers. As described above, for example, as donors 40 are shopping in a participating retail store 60, the system 200 may output notifications to those donors 40 via their donor computing devices 140 that available products 264 at the retail store 60 have been requested by a person in need in their community. Accordingly, a donor 40 who has used the system 200 may not even realize that the retail store 60 participates in the service until the donor 40 receives a notification.

Figure 6:
FIG. 6 is a flowchart illustrating a process enabling a donor to utilize multiple commerce systems according to an exemplary embodiment.

FIG. 6 is a flowchart illustrating a process 600 enabling a donor 40 to utilize multiple commerce systems 160 according to another exemplary embodiment.

As shown in FIG. 5, the commerce system 160 provides electronic commerce functionality to a donor 40 in step 402. As briefly mentioned above, the donor data 240 for the donor 40 includes a unique identifier 242 (e.g., email address) identifying the donor 40. In step 604, the commerce system 160 outputs the unique identifier 242 used by the donor 40 when using the commerce system 160 to the donation application server 180.

For instance, the donation application server 180 may compare the residential location of the user with the requestor residences 228 of the requestors 20 in step 426 and identify a requestor residence 228 that is the same as the residential location of the user, within a predetermined distance of the residential location of the user, or closest to the residential location of the user in step 428. The donation application server 180 may identify the products requested by the requester 20 identified in step 428 (identified products

224) from among the available products 264 offered by the commerce system 160 being used by the donor in step 430.

The commerce system 160 and the donation application server 180 provide functionality for the donor 40 to browse, purchase, and donate the requested products 224 in step 350.

Figure 7:
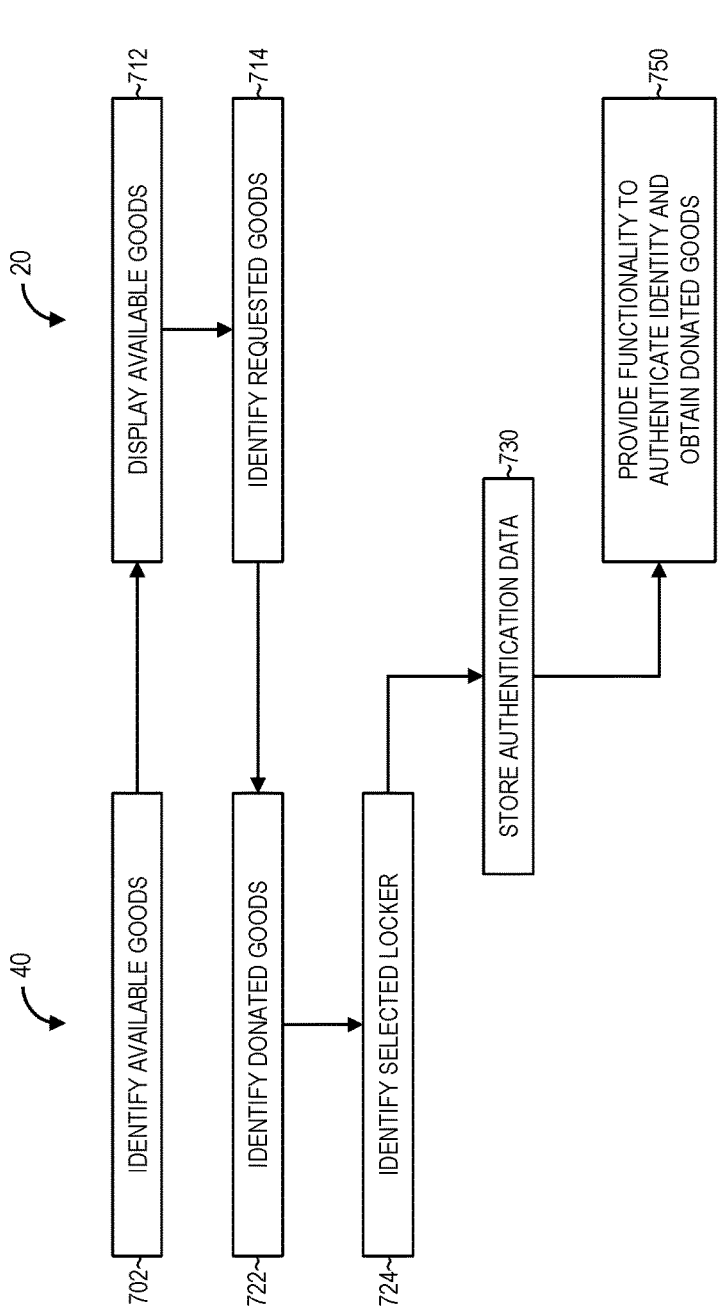
FIG. 7 is a flowchart illustrating a process enabling a donor to safely and securely donate goods directly to a person in need in the donor's community.

FIG. 7 is a flowchart illustrating a process 700 enabling a donor 40 to safely and securely donate goods directly to a requestor 20 according to an exemplary embodiment.

As shown in FIG. 7, the donation application server 180 provides functionality for the donor 40 to identifies goods that the donor 40 wishes to donate (available goods 244) in step 702. The donor user interface 254 may also provide functionality to take and/or upload a photograph of the available goods 244 and specify product attributes (e.g., sizes, colors, shapes, configuration, styles, etc.). The donation application server 180 enables a requestor 20 to view those available goods 244 in step 712 and request those goods (requested goods 224) in step 714. The donation application server 180 provides functionality for the donor 40 to indicate that that the donor 40 has donated those goods (donated goods 246) in step 722.

As described above, in some embodiments, the system 200 enables donors 40 to transfer donated goods 246 to requestors 20 using a network-connected locker system 170. A locker is selected (selected locker 176) by the donor 40, the donation application server 180, or the network-connected locker system 170 in 724.

Authentication data 272 is stored in step 730 and the system 200 provides functionality for the requestor to open the selected locker 176 and access the donated goods 246 in step 750. In some embodiments, the authentication data 272 identifies the requestor 20 that has been granted access to the locker 176 by the system 200 and, in response to a request sent by that requestor 20 using a requestor computing device 120, the donation application server 180 outputs an instruction to the network-connected locker system 170 to open the selected locker 176. In other embodiments, the authentication data 272 includes a PIN for providing access to the contents of the selected locker 176. The PIN may be generated by the network-connected locker system 170 or the donation application server 180. In other instances, the PIN may be selected by the donor 40 and provided via the network-connected locker system 170 or the donor computing device 140. In those instances, the donation application server 180 outputs the PIN to the donor computing device 140 for use by the donor 40 to access the selected locker 176. In other instances, the PIN may be specified by the requestor 20 using the requestor computing device 120. In those instances, the donation application server 180 transmits the PIN to the network-connected locker system 170 for storage by the network-connected locker system 170 so that the network-connected locker system 170 can provide access to the selected locker 176 when the PIN is input by the requestor 20.

While the embodiments described above reference essential products, the system 200 is not so limited and may be used to provide functionality for donors 40 to purchase essential services (e.g., health care, child care, telephone service, internet access, transportation, food, educational items and services, etc.) and donate those essential services to requestors 20.

While preferred embodiments have been set forth above, those skilled in the art who have reviewed the present disclosure will readily appreciate that other embodiments can be realized within the scope of the invention. Therefore, the present invention should be construed as limited only by any appended claims.

What is claimed is:

1. A location-based system enabling a donor to purchase and donate products from an electronic commerce retailer for donation to a requestor in need requesting those products, the system comprising:

non-transitory computer readable storage media that stores:

requestor data for each of a plurality of requestors, including the residential location of the requestor and eligibility data indicating that the requestor is eligible for government assistance; and donor data for each of a plurality of donors, including the residential location of the donor;

a commercial interface that receives information, from an electronic commerce system of the electronic commerce retailer, indicative of products available for purchase from the electronic commerce retailer;

a requestor user interface that provides functionality for the requestor to request one or more of the products available for purchase from the electronic commerce retailer; and a donation application server that:

identifies a requestor by comparing the residential location of the donor to the residential locations of each of the plurality of requestors;

provides functionality for the identified requestor to request products available for purchase from the electronic commerce retailer;

receives an indication that the donor is accessing the electronic commerce system of the electronic commerce retailer; and outputs information identifying the products requested by the requestor for construction of a hybrid webpage that includes the electronic commerce system of the electronic commerce retailer and a window or a widget that includes functionality for the donor to add the products requested by the requestor to an electronic shopping cart provided by the electronic commerce retailer for donation to the requestor.

2. The system of claim 1, wherein the window or widget further includes information regarding the requestor.

3. The system of claim 2, wherein the information regarding the requestor includes the residential location of the requestor.

4. The system of claim 1, wherein the donation application server generates web content for display within the window or widget that provides the functionality for the donor to add the products requested by the requestor to the electronic shopping cart.

5. The system of claim 4, wherein:

the window or widget provides functionality for the donor to output an instruction to the donation application server to add the products requested by the requestor to the electronic shopping cart;

the donation application server forwards the instruction to the electronic commerce server and provides information identifying the requestor and the shipping address of the requestor to the electronic commerce server.

6. The system of claim 1, wherein the electronic commerce server generates web content for display within the window or widget that provides the functionality for the donor to add the products requested by the requestor to the electronic shopping cart.

7. The system of claim 6, wherein the donation application server outputs, to the electronic commerce server, information regarding the requestor and identifying the products requested by the requestor.

* * * * *